(12) United States Patent
Groomes

(10) Patent No.: US 6,648,311 B2
(45) Date of Patent: Nov. 18, 2003

(54) ASSEMBLY AND METHOD OF EXERCISING AN AIRPLANE LANDING GEAR STRUT

(75) Inventor: Kim C. Groomes, Hartland, MI (US)

(73) Assignee: Pentastar Aviation, Inc., Waterford, MI (US)

( * ) Notice: Subject to any disclaimer, the term of this patent is extended or adjusted under 35 U.S.C. 154(b) by 0 days.

(21) Appl. No.: 10/107,924

(22) Filed: Mar. 27, 2002

(65) Prior Publication Data

US 2003/0183993 A1 Oct. 2, 2003

(51) Int. Cl.⁷ .................................................. F16F 9/43
(52) U.S. Cl. ...................... 267/64.28; 267/182; 60/453; 92/79; 254/132
(58) Field of Search ........................ 60/453; 244/100 R, 244/102 R, 104 FP, 104 CS; 92/79; 254/30, 130, 132; 267/64.11, 64.28, 182

(56) References Cited

U.S. PATENT DOCUMENTS

| 2,452,369 A | * | 10/1948 | Gravenhorst et al. ......... 91/419 |
| 2,655,232 A | | 10/1953 | Etherton |
| 3,136,128 A | * | 6/1964 | Suter ............................ 60/481 |
| 3,157,478 A | * | 11/1964 | Edwards ....................... 95/261 |
| 3,410,087 A | * | 11/1968 | Arnes ........................... 60/430 |
| 3,458,016 A | | 7/1969 | Keech |
| 3,533,613 A | | 10/1970 | Bendicsen |
| 3,696,894 A | | 10/1972 | Brady et al. |
| 4,061,295 A | | 12/1977 | Somm |
| 4,405,119 A | | 9/1983 | Masclet et al. |
| 4,597,548 A | | 7/1986 | Bergloff et al. |
| 5,372,353 A | * | 12/1994 | West .......................... 254/10 B |
| 5,390,586 A | * | 2/1995 | Jones ............................. 92/79 |
| 5,927,646 A | * | 7/1999 | Sandy et al. ................. 244/108 |
| 5,996,979 A | | 12/1999 | Hrusch |
| 6,347,786 B1 | * | 2/2002 | Lai ........................... 254/93 H |
| 6,378,843 B1 | * | 4/2002 | Hong .......................... 254/2 R |
| 6,405,531 B1 | * | 6/2002 | Hong ........................... 60/481 |
| 2001/0050358 A1 | * | 12/2001 | Tominaga et al. ........... 254/8 B |
| 2002/0153514 A1 | * | 10/2002 | Wixey ........................ 254/8 B |

* cited by examiner

Primary Examiner—Christopher P. Schwartz
Assistant Examiner—Devon Kramer
(74) Attorney, Agent, or Firm—Carlson, Gaskey & Olds

(57) ABSTRACT

A strut exercise assembly for an aircraft comprises a fluid strut telescopic along a path. A couple selectively connects the fluid strut to a driver. The driver telescopes the fluid strut along a path through the couple.

10 Claims, 3 Drawing Sheets

ASSEMBLY AND METHOD OF EXERCISING AN AIRPLANE LANDING GEAR STRUT

BACKGROUND OF THE INVENTION

This invention relates to an assembly for exercising a hydraulic strut of an aircraft.

As part of regular maintenance of an aircraft, the struts of the aircraft carriage are inspected and serviced. These struts are typically hydraulic and require periodic recharging of the hydraulic fluid that provides the damping between the piston and the cylinder of the strut.

Recharging involves replacing the lost hydraulic fluid by pumping hydraulic fluid through an opening of the strut's cylinder. During this process, however, air is unintentionally introduced into the cylinder, creating air pockets within the hydraulic fluid of the strut. These air pockets may affect the strut's performance. Accordingly, it is desirable to remove air from the hydraulic cylinder.

One technique employed for removing air from the cylinder involves the placement of a tire jack underneath the tires of the aircraft strut. The jack is pumped up and down causing the cylinder of the strut to be exercised, i.e., telescoped in and out relative to the piston of the strut. The relative movement of the piston to the hydraulic cylinder causes air to be worked out of the cylinder.

This technique is cumbersome. The round tires of the strut may bounce or slip off the platform of the jack even if the wheels are secured against rotation. Moreover, the technique is labor intensive, requiring a technician to manually pump a jack.

A need therefore exists for a method and assembly that permits excess air to be worked out of the hydraulic cylinder in an efficient manner.

SUMMARY OF THE INVENTION

The present invention comprises an assembly and technique for introducing hydraulic fluid and removing excess air from a strut of an aircraft. The assembly includes a couple that is selectively connectable to the strut. The couple secures the strut to a driver that moves the strut up and down, thereby exercising excess air from the strut.

The strut exercise assembly may include a source of hydraulic fluid that provides fluid to the strut. In this way, the strut may be filled with fluid while the driver exercises the strut. The couple ensures that the strut will remain closely connected to the driver and prevent the strut from disconnecting from the driver while in motion.

The assembly may also include a frame to support the fluid strut. A lever may be made part of the assembly to support the couple while the strut is in the frame. The lever may help distance the driver from the strut, creating a safer work environment and adding leverage to the action of the driver. The driver may be pneumatically powered rather than manually powered. It may further drive the strut in an oscillating fashion. A control switch may actuate operation of the driver.

The couple may have a feature that mates with a feature of the fluid strut, securing the connection between driver and strut. For example, the couple may be a peg that fits into a hole of the strut. Also, the couple may have a cup that embraces a rounded end of the strut.

By using this assembly, an aircraft strut may be coupled to a driver. The strut may be then filled with fluid, and the strut exercised by the driver by telescoping the strut up and down. Air may be bled from the strut while the fluid is exercised.

Thus, the present invention provides the benefits of exercising the strut through a driver that is coupled securely to the strut. A technician may exercise the aircraft strut without the exertion of significant manual effort. In addition, he may do so without concern about the strut.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
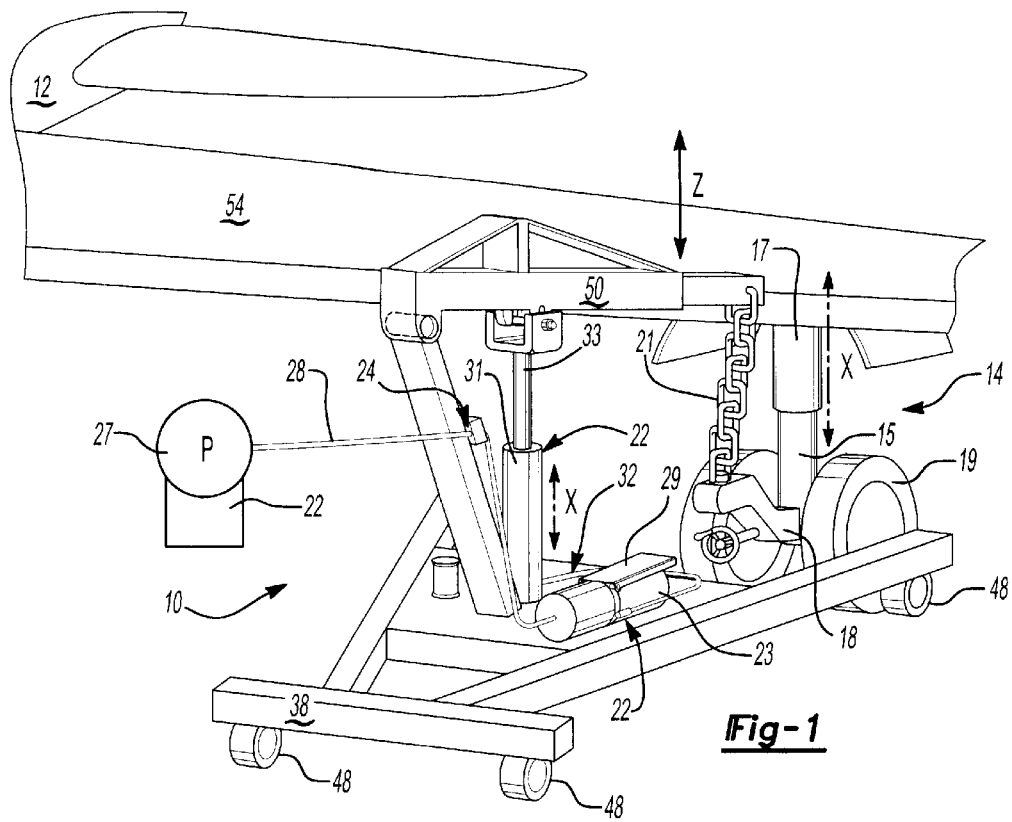
FIG. 1 illustrates a strut exercise assembly, including couple, driver and frame.

FIG. 1 illustrates a strut exercise assembly 10. Fluid strut 14 is attached to an aircraft carriage 54 of an aircraft 12 and travels along vertical axis X. Fluid strut is a hydraulic strut assembly having a piston 15 and cylinder 17. As known, hydraulic fluid fills hydraulic cylinder 17 and dampens movement of piston 15 within cylinder 17.

Service and maintenance of the strut requires periodic recharging of the hydraulic fluid in cylinder 17. Fluid must be reintroduced into cylinder 17 and air pockets worked out of the fluid once in cylinder 17.

In contrast to existing techniques strut exercise assembly 10 employs couple 18 linking fluid strut 14 to driver 22, Driver 22 is powered by pneudraulic pump 23 to repeatedly drive lever 50 generally along vertical axis X in an oscillating manner. As driver 22 moves lever 50 along vertical axis X, couple 18 drives piston 15 to compress and expand relative to hydraulic cylinder 17 in a telescoping fashion. Lever 50 is supported by frame 38, which is constructed so as to support not only lever 50 but the portion of aircraft carriage 54 lifted by lever 50. In this way, strut exercise assembly 10 permits recharging of hydraulic fluid without removing fluid strut 14 from aircraft carriage 54. In addition, as shown in this figure, frame 38 has wheels 48 attached to frame to permit the movement of strut exercise assembly 10 from location to location within an aircraft hanger.

The power source for strut exercise 10 assembly here is shown as a pneumatic and hydraulic power source. Compressed air from pump 27 is introduced through a line 28 into a speed control 24, an air regulator. Speed control 24 adjusts the rate of air flowing through line 28, supplying air pressure to pneudraulic pump 23, which is commercially available. Lowering the rate of air flow into pneudraulic pump 23 lowers the rate of movement of lever 50 and therefore of piston 15.

Pneudraulic pump 23 is preferably adjusted to provide approximately 3,000 psi of lift pressure to lever 50. Such pressure should be sufficient to be able to lift and oscillate fluid strut 14, including a portion of aircraft carriage 54, without damaging aircraft 12. Such pressure may depend on the aircraft and its weight.

As known, pedal 29 controls release of compressed air within line 28 and actuation of pneudraulic pump 23 so that depression of pedal 29 causes hydraulic fluid in line 32 to expand hydraulic piston 33 within cylinder 31. Release of pedal 29 causes piston 33 to fall within cylinder 31. By pumping and releasing pedal 29, piston 33 expands and retracts so as to cause an oscillating movement of lever 50 along axis X. This motion causes fluid strut 14 to expand and compress along vertical axis X.

Figure 2:
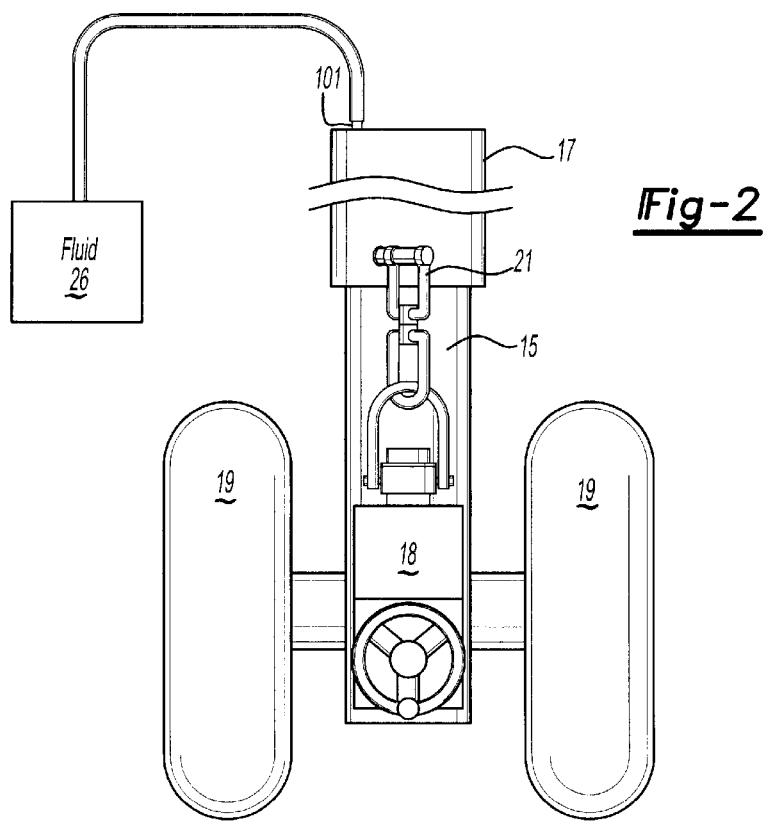
FIG. 2 presents an alternative view of the assembly of FIG. 1, showing the introduction of hydraulic fluid into the strut and the bleeding of air out of the strut.

FIG. 2 illustrates how hydraulic fluid may be introduced into fluid strut 14. FIG. 2 shows an alternative view of fluid strut 14 of FIG. 1. Piston 15 may telescope within cylinder 17 along axis X. During a low fluid level condition of fluid strut 14, cylinder 17 lowers into piston 15. Hydraulic fluid may be drawn into cylinder 17 from fluid source 26 through valve 101 as hydraulic strut 14 expands along axis X. During this process, however, due to the viscous nature of the hydraulic fluid, air pockets may form within hydraulic cylinder 17 as hydraulic fluid is refilled through valve 101.

To promote optimal operation of fluid strut 14, air must be removed from hydraulic cylinder 17. As mentioned, by expanding fluid strut 14 along axis X in a telescoping manner, hydraulic fluid from fluid source 26 may be introduced into hydraulic cylinder 17 through valve 101. By contracting fluid strut 14, air may be expressed out of the same valve 101 back to fluid source 26. Accordingly, oscillating or exercising fluid strut 14 permits hydraulic fluid to be introduced into cylinder 17 and air expressed or bled out of cylinder 17. Fluid strut 14 is exercised until the strut is sufficiently filled with hydraulic fluid as may be gauged by the relative position of piston 15 to cylinder 17. Couple 18, here shown sandwiched between wheels 19, drives the telescopic movement of fluid strut 14. As shown, in contrast to existing techniques, couple 18 provides a secure link between fluid strut 14, driver 22, and frame 38, which supports the weight of fluid strut 14 as well as a portion aircraft carriage 54.

Figure 3:
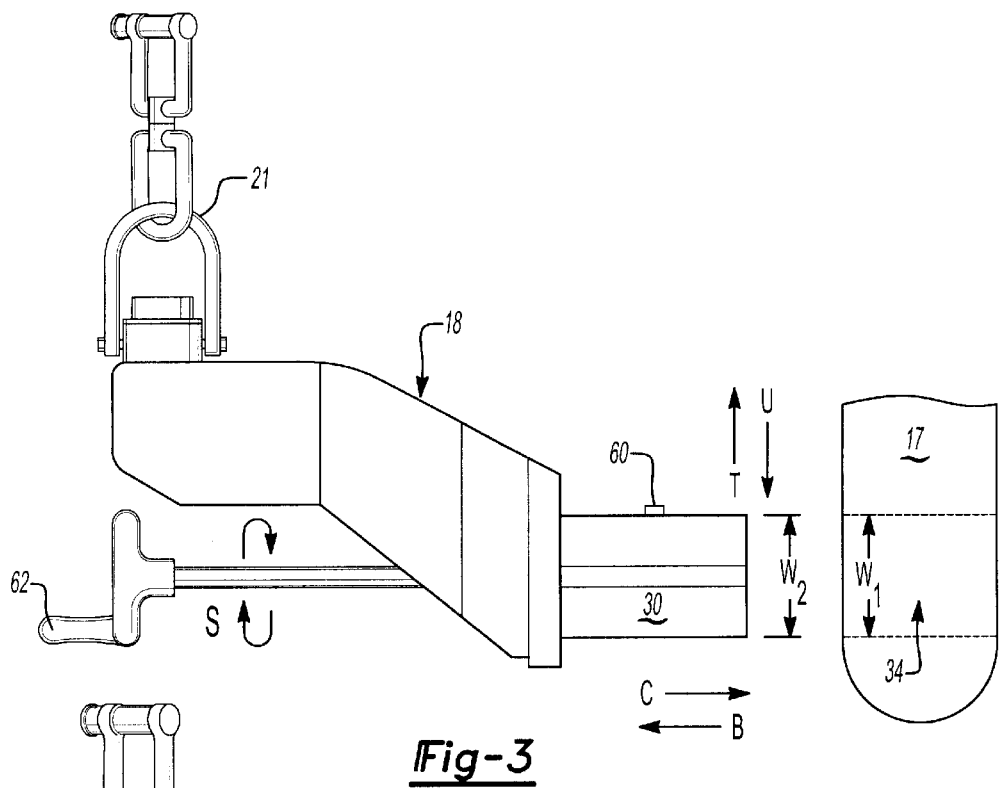
FIG. 3 illustrates a couple, comprising a peg and hole design.

One form of this inventive connection comprises a peg and hole link. Shown in FIG. 3 is a section of piston 15. Typically, piston 15 has a hole 34 passing through it. This hole has a diameter W1. To take advantage of this strut feature, couple 18 comprises peg 30 of a diameter W2 close to diameter W1 to provide a snug fit between hole 34 and peg 30. Thus, peg 30 may be introduced into hole 34 by moving peg 30 along the direction of arrow C. It may be removed from hole 34 by moving peg along the direction of arrow B.

To lock peg 30 into hole 34, pin 60 is provided. Pin 60 is selectively expandable from peg 30. By rotating handle 62 along clockwise direction S, peg 60 expands along arrow T. If this expansion of pin 60 occurs while peg 30 is within hole 34, pin 60 serves to lock peg 30 through compression force. By rotating handle 62 in a counterclockwise direction, pin 30 moves in the direction of arrow U, recessing within peg 30. Peg 30 may then be removed from hole 34. As shown, links 21 connect couple 18 to lever 50.

Figure 4:
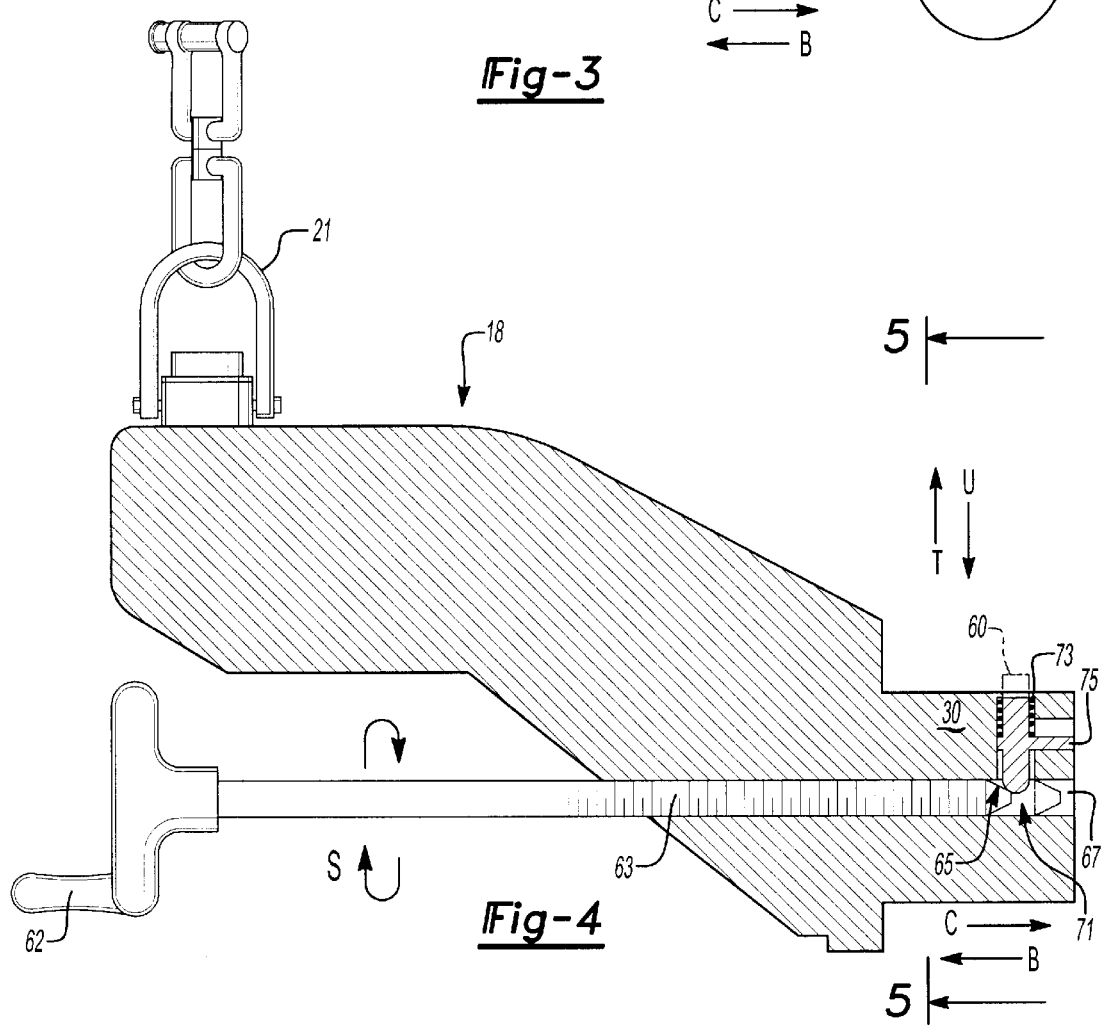
FIG. 4 illustrates an alternative view of the peg of FIG. 3.

FIG. 4 illustrates movement of pin 60 within peg 30 as viewed by cross-section. Handle 62 actuates rotation of threaded member 63 that moves incline end portion 65 because threaded member 63 is threadedly received in threaded channel 67. Rotation of handle 62 in clockwise direction moves threaded member 63 and incline end portion 65 in the direction of arrow C. As incline end portion 65 contacts incline end portion 71, such as a rounded end, of pin 62, pin 62 moves in the direction of arrow T, locking peg 30 in hole 34. Spring 73 is operatively linked to pin 60 through arm 75 of pin 60 and to peg 30. As pin 60 moves along arrow T, spring 73 compresses.

When handle 62 is rotated in counterclockwise direction, thread member 63 and incline end portion 65 moves in direction of arrow B. Incline end portion 71 of pin 62 then moves in direction of arrow U as spring 73 expands. Pin 62 is then withdrawn into peg 30 permitting withdrawal of peg 30 from hole 34.

Figure 5:
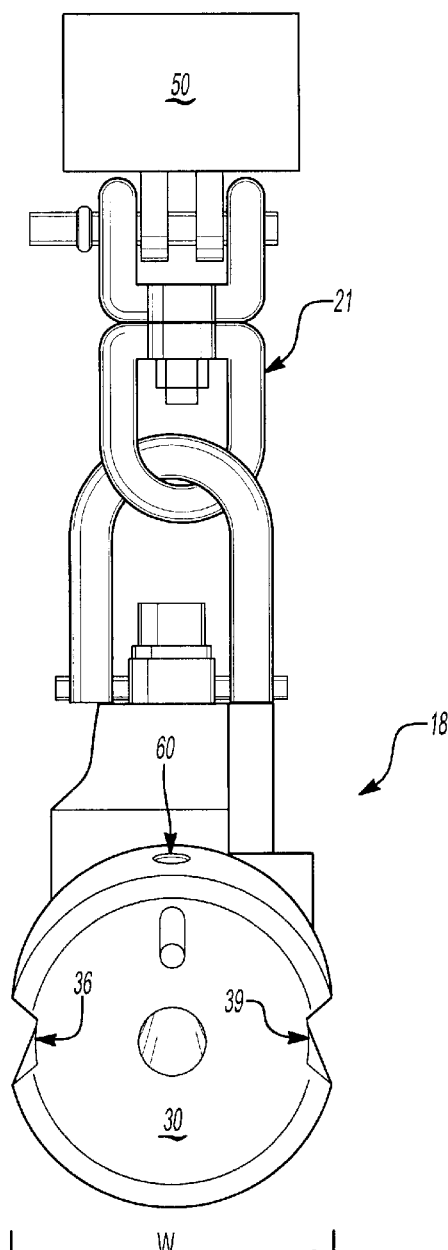
FIG. 5 illustrates a cross-sectional view of the peg of FIG. 3.

FIG. 5 shows an alternative view of couple 18 of FIG. 3. This perspective particularly highlights grooves 36 and 39 of peg 30. Grooves 36 and 39 are formed on peg 30 to permit the accommodation of wiring typically found within hole 34.

Figure 6:
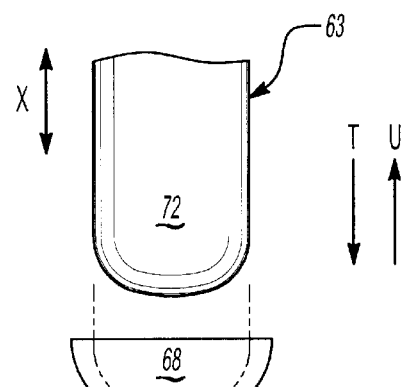
FIG. 6 illustrates a couple comprising a ball and cup design.
Figure 6:
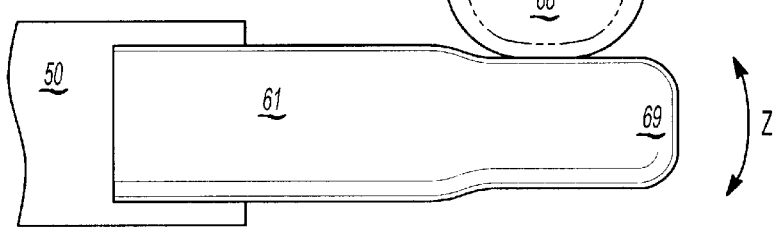

Rather than employ couple 18, couple 61 may be employed as shown in FIG. 6. This particular form is useful for fluid strut 63 located beneath an airplane nose. Fluid strut 63 has rounded portion 72, such as a ball joint. Cup 68 has size to fit rounded portion 72. Thus, rounded portion 72 may be placed in cup 68 along arrow T and may be removed from cup 68 along arrow U. Cup 68 itself is linked to lever 50 by rigid bar 61 in place of links 21. Rounded portion 72 may rotate within cup 68 as lever 50 moves up and down along vertical axis X. Notably, end portion 69 of bar 61 will actually circumscribe arc Z as lever arm 50 pivots on frame 38. Accordingly, it is important to design cup 68 to have sufficient room so that rounded portion 72 may rotate within cup 68 as end portion 69 circumscribes arc Z.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A strut exercise assembly for an aircraft, comprising:
   a couple selectively connectable to a fluid strut of an aircraft;
   a driver operatively connected to said couple, said driver for telescoping the fluid strut along a path through said couple; and
   wherein said couple has a first feature sized to mate with a second feature of the fluid strut.

2. The strut exercise assembly of claim 1 including a frame for supporting the fluid strut.

3. The strut exercise assembly of claim 1 wherein said driver is capable of telescoping the fluid strut in an oscillating manner.

4. The strut exercise assembly of claim 1 wherein said driver is at least partially pneumatically powered.

5. The strut exercise assembly of claim 1 including a control controlling said driver.

6. The strut exercise assembly of claim 1 including a lever supporting said couple and driven by said driver.

7. The strut exercise assembly of claim 1 wherein said first feature comprises a peg and said second feature comprises a hole.

8. The strut exercise assembly of claim 1 wherein said first feature comprises a cup and said second feature comprises a rounded end.

9. The strut exercise assembly of claim 1 wherein said peg has a pin to lock said couple to the fluid strut.

10. The strut exercise assembly of claim 1 wherein said first feature has a first size and a second size, said first feature expandable from said first size to said second size and said second size locking said couple to the fluid strut.

* * * * *